United States Patent
Jana et al.

(10) Patent No.: US 10,003,390 B2
(45) Date of Patent: Jun. 19, 2018

(54) SYSTEM AND METHOD FOR PRECODED FASTER THAN NYQUIST SIGNALING

(71) Applicants: Mrinmoy Jana, Vancouver (CA); Jeebak Mitra, Ottawa (CA); Lutz Hans-Joachim Lampe, Vancouver (CA); Ahmed Mohamed Ibrahim Medra, Vancouver (CA)

(72) Inventors: Mrinmoy Jana, Vancouver (CA); Jeebak Mitra, Ottawa (CA); Lutz Hans-Joachim Lampe, Vancouver (CA); Ahmed Mohamed Ibrahim Medra, Vancouver (CA)

(73) Assignee: HUAWEI TECHNOLOGIES CANADA CO., LTD., Kanata (CA)

( * ) Notice: Subject to any disclaimer, the term of this patent is extended or adjusted under 35 U.S.C. 154(b) by 0 days. days.

(21) Appl. No.: 15/341,227

(22) Filed: Nov. 2, 2016

(65) Prior Publication Data
US 2017/0310373 A1  Oct. 26, 2017

Related U.S. Application Data

(60) Provisional application No. 62/325,758, filed on Apr. 21, 2016.

(51) Int. Cl.
| H04L 25/49 | (2006.01) |
| H04B 7/0456 | (2017.01) |
| H04B 7/0417 | (2017.01) |
| H04L 25/03 | (2006.01) |

(52) U.S. Cl.
CPC ......... H04B 7/0456 (2013.01); H04B 7/0417 (2013.01); H04L 25/03834 (2013.01)

(58) Field of Classification Search
CPC ..... H03F 1/3247; H04L 27/368; H04L 1/005; H04L 1/0071; H04B 7/155
USPC .............................. 375/296, 295, 341, 343
See application file for complete search history.

(56) References Cited

U.S. PATENT DOCUMENTS 8,514,966 B2   8/2013 Wajcer
2016/0308697 A1*  10/2016 Gattami ............ H04L 25/03834

OTHER PUBLICATIONS

Adnan Prlja, John B Anderson, Fredrik Rusek, "Receivers for Faster-than-Nyquist Signaling with and without Turbo Equalization", IEEE Int. Symp. on Inf. Theory, Jul. 2008, pp. 464-468, Toronto, CA.

(Continued)

*Primary Examiner* — Khai Tran

(57) ABSTRACT

Systems and methods of precoded faster than Nyquist (FTN) signalling are provided. In the transmitter, Tomlinson-Harashima Precoding (THP) is applied to produce precoded symbols. The THP is based on inter-symbol interference (ISI) due to using faster than Nyquist (FTN) signalling. An inverse modulo operation is not performed in the receiver. Instead, in the receiver, FTN processing is performed based on a matched filter output by determining log a-posteriori probability ratio LAPPR values computed for an $n^{th}$ bit $b_n$ of a $k^{th}$ received symbol and pre-computed a-priori probabilities of an extended constellation for a given pulse shape h(t) and FTN acceleration factor combination.

21 Claims, 11 Drawing Sheets

(56) References Cited

OTHER PUBLICATIONS

Adnan Prlja, John B Anderson, "Reduced-complexity Receivers for Strongly Narrowband Intersymbol Interference Introduce by Faster-than-Nyquist Signaling", IEEE Trans. Communications, Sep. 2012, pp. 2591-2601, vol. 60, No. 9.

Jungpil Yu, Joosung Park, Fredrik Rusek, Boris Kudryashov, Irina Bocharova, "High Order Modulation in Faster-than-Nyquist Signaling Communication Systems", IEEE 80th Veh. Tech. Conf. Fall (VTC) 2014, pp. 1-5.

M. Tomlinson, "New Automatic Equalizer Employing Modulo Arithmetic", Electronics Letters, Feb. 1971, p. 1-2.

H. Harashima and H. Miyakawa, "Matched-Transmission Technique for Channels with Intersymbol Interference", IEEE Trans. Communications, Aug. 1972, pp. 774-780, vol. com—20, No. 4.

Jana, M. et al., "Precoded Faster-than-Nyquist Coherent Optical Transmission", in ECOC 2016—42nd European Conference on Optical Communication Conference, pp. 800-802, Sep. 18-22, 2016, Düsseldorf, Germany.

Chang, D. et al., "Robust Faster-than-Nyquist PDM-mQAM Systems with Tomlinson-Harashima Precoding", IEEE Photonics Technology Letters, vol. 28, No. 19, pp. 2106-2109, Oct. 1, 2016.

Chang, D. et al., "Tomlinson-Harashima Precoding with Soft Detection for Faster than Nyquist DP-16QAM Coherent Optical Systems", Optical Fiber Communication Conference, Los Angeles, U.S.A., 3 pages, Mar. 2015, paper Th3E.8.

Prlja, A. et al., "Receivers for Faster-than-Nyquist Signaling with and without Turbo Equalization", IEEE International Symposium on Information Theory, 5 pages, 2008.

El Hefnawy, M. et al., "Overview of Faster-than-Nyquist for Future Mobile Communication Systems", 2013 IEEE 77th Vehicular Technology Conference (VTC Spring), 5 pages, Jun. 2-5, 2013.

Said, A. et al., "Bandwidth-Efficient Coded Modulation with Optimized Linear Partial-Response Signals", IEEE Transactions on Information Theory, vol. 44, No. 2, pp. 701-713, Mar. 1998.

Peh, E. et al., "Power and modilo loss tradeoff with expanded soft demapper for LDPC coded GMD-THP MIMO systems", IEEE Transactions on Wireless Communications, vol. 8, No. 2, pp. 714-724, 2009.

* cited by examiner

SYSTEM AND METHOD FOR PRECODED FASTER THAN NYQUIST SIGNALING

This application claims the benefit of and priority to U.S. Provisional application No. 62/325,758 filed Apr. 21, 2016.

FIELD OF INVENTION

The present invention relates generally to Faster-than-Nyquist (FTN) transmission, and to channel equalization and decoding techniques for high speed digital communication systems and more specifically to methods and apparatus for generating soft outputs for communication systems using Faster than Nyquist transmission.

BACKGROUND OF THE INVENTION

The massive increase in demand for high bandwidth for network based applications such as cloud computing, video on demand, tele-presence and the like has led to an immediate need for increasing data rates for current backbone transmission networks such as those provided by optical fiber links. Data rates can be increased by increasing the spectral efficiency i.e. bits per second per unit bandwidth (Hertz) of the existing fiber optic link. A potential solution to the increasing spectral efficiency requirements for optical fiber communications is the use of non-orthogonal transmission through FTN signaling. FTN signaling is a linear modulation scheme that improves the spectral efficiency by reducing the time and/or frequency spacing between two adjacent pulses, thus introducing inter-symbol interference (ISI) and/or inter-carrier interference (ICI). Alternatively, FTN is a technique that allows for increased bit rate while preserving the signaling bandwidth by sending the data bearing pulses faster than what is recommended by "Nyquist's criterion" for ISI-free transmission. If it can be ensured that the ISI introduced by FTN transmission can be adequately compensated for, a higher transmission rate is possible with only nominal increase in the signal-to-noise ratio (SNR) of the signal at the cost of relatively higher receiver complexity.

Furthermore, modern high-performance communication systems frequently employ sophisticated forward error correction (FEC) codes such as turbo codes, low-density parity-check (LDPC) codes etc., to lower the overall bit error rate (BER). When FTN is used in conjunction with FECs, soft Viterbi algorithm (SOYA) based maximum-likelihood sequence estimation (MLSE) and Bahl-Cocke-Jelinek-Raviv (BOR) algorithm based maximum a posteriori (MAP) symbol-probability methods are considered to be the practical close-to-optimal approaches for FTN equalization to produce inputs to the FEC decoder. See for example "Receivers for Faster-than-Nyquist Signaling with and without Turbo Equalization", A Prlja, J. B. Anderson and F. Rusek, *IEEE Int. Symp. on Inf. Theory*, 2008, "Reduced-complexity Receivers for Strongly Narrowband Intersymbol Interference Introduce by Faster-than-Nyquist Signaling", A. Prlja and J. B. Anderson, *IEEE Trans. Commun.*, 2012, and "High Order Modulation in Faster-than-Nyquist Signaling Communication Systems", J. Yu, J. Park, F. Rusek, B. Kudrayashov and I. Bocharova, *IEEE 80th Veh. Tech. Conf. Fall (VTC)* 2014.

The computational complexity of the above equalization schemes can be extremely high. Among sub-optimal low-complexity receivers, linear equalizers and decision-feedback equalizers (DFEs) are potential candidates, which however suffer from performance degradation and in case of DFE, error propagation is a known major issue.

Tomlinson-Harashima Precoding (THP) has been used in systems to pre-compensate ISI introduced by the channel. However, conventional applications of THP at the transmitter rely on feedback of the channel information from the receiver to estimate the ISI introduced by the channel. For more details of conventional applications of THP, see, for example M. Tomlinson, "New Automatic Equalizer Employing Modulo Arithmetic", *Electronics Letters*, 1971, and H. Harashima and H. Miyakawa, "Matched-Transmission Technique for Channels with Intersymbol Interference", *IEEE Trans. Commun.*, 1972.

The application of THP includes a modulo-operation at the transmitter and at the receiver and it is known to suffer from an associated "modulo loss". A modulo operation of the THP receiver in systems that pre-compensate for ISI introduced by the channel keeps the received signal inside the modulo-boundary [M, M) for an M-ary pulse amplitude modulation (PAM) symbol (or equivalently an $M^2$-ary quadrature amplitude modulation (QAM) symbol) which might cause (in the low to moderate signal-to-noise ratio (SNR) regime) the received symbols to be wrapped around to the wrong side of the constellation. This, in turn, may give rise to erroneous log-likelihood ratio (LLR) computation, which is required by the FEC (e.g. LDPC) decoder as intrinsic information. These inaccurate LLR values can cause significant degradation in the bit-error-rate (BER) performance. For example, in coherent optical systems where the FEC input is required to reach a certain threshold BER in order to ensure error-free transmission at the output of the LLR, the condition may no longer hold true due to the erroneous LLR distribution caused by the modulo loss.

SUMMARY

Systems and methods are provided that combine the use of FTN signalling and THP precoding to increase bandwidth utilization. The THP precoding is introduced in the transmitter to pre-compensate for the ISI effects due to use of FTN signalling. At the receiver, rather than performing an inversion of a modulo operation, LLRs are computed based on an extended constellation. Advantageously, the issue with modulo loss present in conventional THP receivers is mitigated.

A broad aspect of the invention provides a method that involves applying Tomlinson-Harashima Precoding (THP) in a transmitter to produce precoded symbols, wherein applying the THP is based on at least one input representative of inter-symbol interference (ISI) due to using faster than Nyquist (FTN) pulse shape. Pulse shaping is applied to the precoded symbols with a faster than Nyquist (FTN) pulse shape. A signal is transmitted based on an output of the pulse shaping.

Another broad aspect provides a transmitter having a forward error correction (FEC) encoder; a coherent optical transmitter comprising a quadrature amplitude modulation (QAM) mapper, a Tomlinson-Harashima Precoder (THP), an FTN pulse shaper, and a digital-to-analog converter; and an electrical-optical front end. The THP produces precoded symbols by applying Tomlinson-Harashima preceding based on at least one input representative of ISI that will be introduced as a result of using faster than Nyquist signalling. The pulse shaper applies pulse shaping to the precoded symbols with a faster than Nyquist (FTN) pulse shape.

Another broad aspect provides a method that involves receiving a signal containing symbols of an extended constellation multiplied by an FTN pulse shape characterized by roll-off factor and time acceleration factor after transmission over a channel. The method continues with performing matched filtering of the received signal based on the FTN pulse shape to produce a matched filter output. Without performing a modulo M operation, FTN processing is performed based on the matched filter output by determining log a-posteriori probability ratio LAPPR values computed for an $n^{th}$ bit of a $k^{th}$ received symbol based on matched filter output and pre-computed a-priori probabilities of the extended constellation for a given pulse shape and time acceleration factor combination. FEC decoding is performed based on the LAPPR values.

Another broad aspect provides a receiver having an optical-electrical front end; a coherent optical receiver comprising an analog-to-digital converter (ADC), matched filter, polarization mode dispersion (PMD) compensator, log likelihood ratio (LLR) generator from THP symbols; and a soft-decision FEC decoder. The LLR generator from THP symbols generates soft-decisions for use by the soft-decision FEC decoder using the method summarized above, or one of the methods described herein.

BRIEF DESCRIPTION OF THE DRAWINGS

Embodiments of the invention will be described in greater detail with reference to the accompanying drawings, in which.

DETAILED DESCRIPTION

Figure 1A:
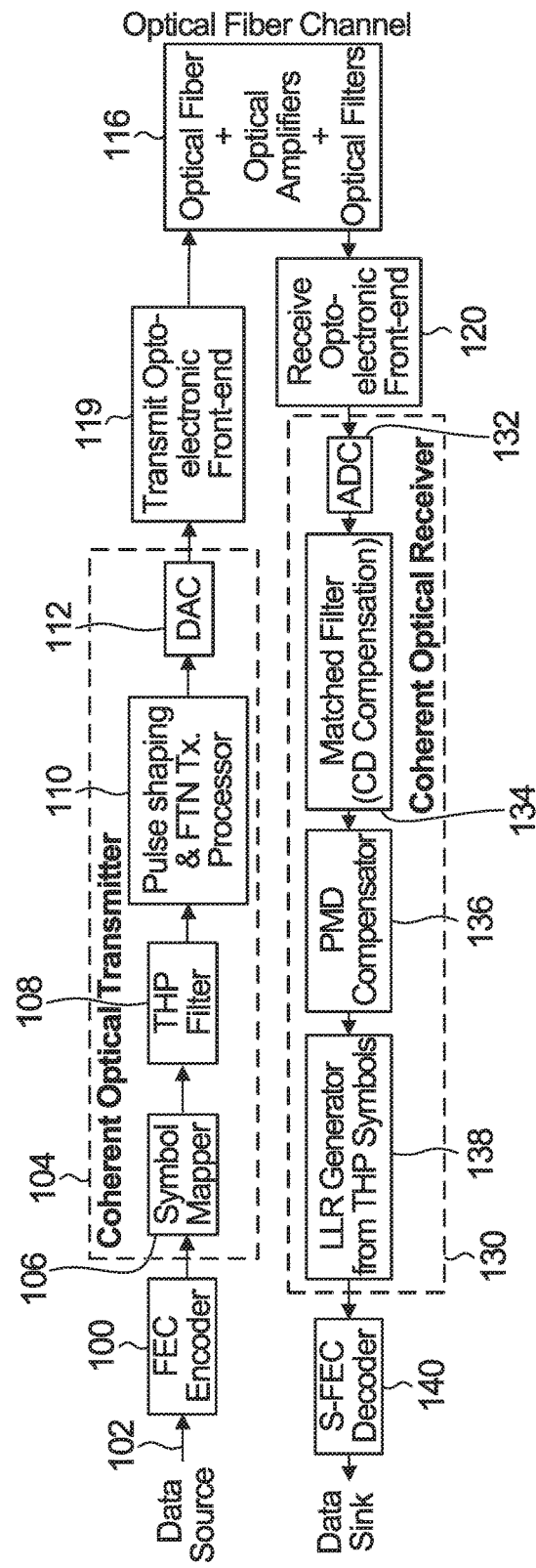
FIG. 1A is a block diagram of a coherent optical system.

A first embodiment of the invention provides a simplified system and method for precoding FTN transmissions using THP, referred to here as an FTN-THP system and method. An optical coherent transportation link consists of a transmitter (Tx), optical fiber channel and a coherent receiver (Rx). A specific example of an FTN-THP transmitter and receiver block diagram is depicted in FIG. 1A. In the transmitter, there is an FEC encoder 100 that performs FEC encoding on data 102 from a data source. The output of the FEC encoder 100 is input to a coherent optical transmitter 104 comprised of a symbol mapper 106, THP filter 108, pulse shaping and FTN transmit processor 110, and digital-to-analog converter (DAC) 112. The function of the THP filter 108 and the pulse shaping and FTN transmit processor 110 are described below by way of example. The coherent optical transmitter connects to a transmit opto-electronic front-end 119 which in turn is connected to an optical fiber channel 116. The transmit opto-electronic front-end 119 may comprise, for example, linear analog drivers that provide an input signal to an optical modulator such as the Mach-Zehnder modulator (MZM) that converts an electrical analog signal to an optical signal In a dual-polarized system, there are two orthogonal linear polarization components (X and Y), wherein each component is further composed of two orthogonal phase components (in-phase I and quadrature Q) that have the same carrier frequency. The carrier frequency is an optical wavelength supplied by a laser.

The optical fiber channel 116 may be comprised of optical filters such as cascaded wavelength selective switch (WSS), fiber and amplifiers that are the sources of chromatic dispersion (CD), polarization mode dispersion (PMD), polarization dependent loss (PDL), polarization rotation and multiplicative phase noise.

In the receiver, there is a receive opto-electrical front end 120 connected to the optical fiber channel 116. The receive opto-electrical front end 120 is connected to a coherent optical receiver 130. The receive opto-electronic front end 120 may, for example, include a polarization beam splitter (PBS) that separates the received optical signal into its constituent orthogonal polarizations. Typically a PBS for a coherent optical receiver also receives a mixing signal from a local laser that has the same frequency as the laser used at the transmitter. A 90 degree optical hybrid is then used for separating I and Q components of each of the polarizations generating four signal data paths namely XI, XQ, YI and YQ. Each of these constituent signals is then converted from optical to electrical domain using photo detectors followed by a trans-impedance amplifier (TIA) that may then provide an input to an analog-to-digital converter (ADC) 132. The digitized signals at the output of the ADC 132 are provided as input to a matched filter 134 that may compensate for the effect of chromatic dispersion, a polarization mode dispersion (PMD) compensator 136, a bit LLR generator from THP symbols 138. Functionality of the LLR generator 138 is described by way of example below. The soft outputs of the LLR generator 138 are fed to a soft decision FEC (S-FEC) decoder 140. Other aspects of signal conditioning may be carried out at one or more DSP blocks where signals are processed and data are recovered. The functions following the ADC 132 are typically all implemented in one or more digital signal processing (DSP) blocks.

Figure 1B:
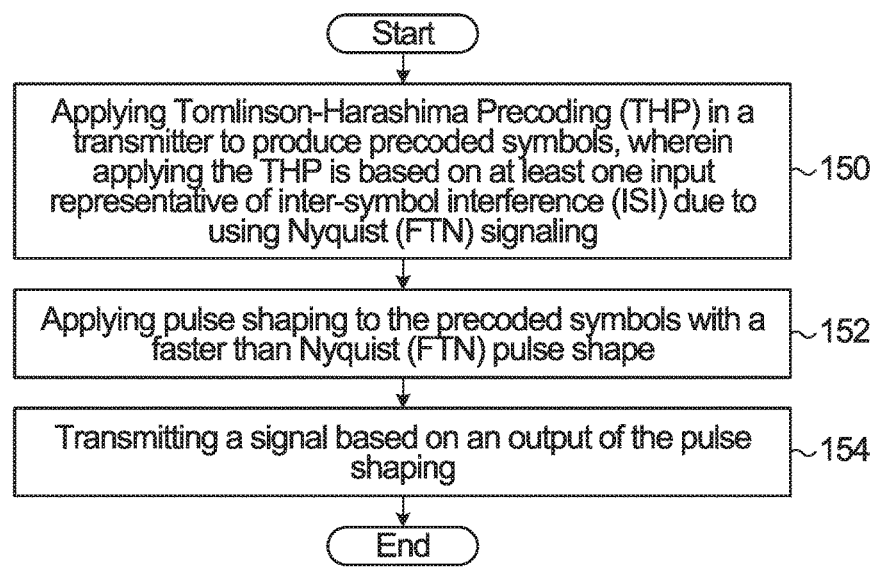
FIG. 1B is a flowchart of a method of transmitting precoded FTN signaling.

Referring now to FIG. 1B, shown is a flowchart of a method of transmitting precoded faster than Nyquist signalling provided by an embodiment of the invention. The method might, for example, be implemented in the transmitter of FIG. 1A. Further details off possible implementations of the method are provided throughout this description. The method begins in block 150 with applying Tomlinson-Harashima Precoding (THP) in a transmitter to produce precoded symbols, wherein applying the THP is based on at least one input representative of inter-symbol interference (ISI) due to using faster than Nyquist (FTN) pulse signalling. In block 152, pulse shaping is applied to the precoded symbols with a faster than Nyquist (FTN) pulse shape. In block 154, a signal is transmitted based on an output of the pulse shaping.

Figure 2:
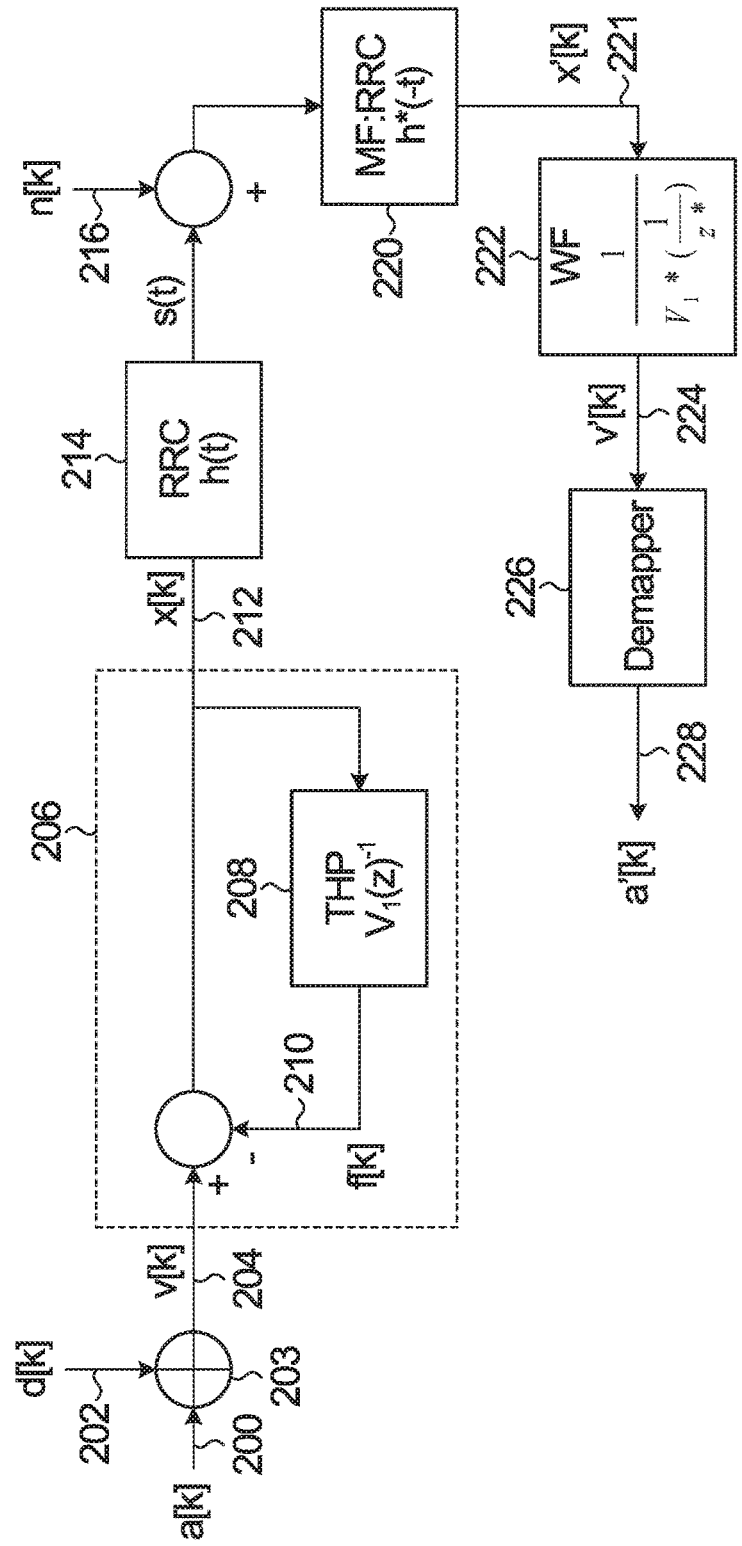
FIG. 2 is an FTN-THP system block diagram.

A simplified FTN-THP system block diagram depicting operations specific to the process of THP-based FTN transmission and reception with additive Gaussian noise (AGN) (which in some implementations may be white Gaussian noise) from the channel is depicted in FIG. 2. On the transmit side, PAM symbols a[k] 200 are combined with d[k] 202 using adder 203 to produce v[k] 204, which are points on an extended constellation for the considered PAM. The addition of d[k] as described is equivalent to a modulo 2M operation, and is described in more detail below with reference to FIG. 4A. The symbols v[k] 204 derived from the extended constellation are passed through a THP feedback loop 206 that has a THP filter 208 in the feedback path. Output f[k] 210 of the THP filter 208 is subtracted from v[k]. The output of the feedback loop 206 is x[k] 212, which is input to a pulse shaper 214 that applies an FTN pulse shape h(t) to the THP precoded symbols. In a specific example, the FTN pulse shape may be a root raised cosine (RRC) pulse shape. The output of the pulse shaper is transmitted over an AGN channel, as depicted by the addition of AGN component n[k] 216.

When FTN is utilized, as in the embodiments below, the data transmission may be represented as follows:

$$s(t) = \sum_k v[k]h(t - \tau kT)$$

where $0<\tau<1$ is the FTN time acceleration factor. $\tau=1$ for Nyquist signaling, but for FTN signaling $0<\tau<1$.

At the receiver, matched filtering based on $h^*(-t)$ is performed in matched filter 220 wherein * denotes complex conjugation and the use of $-t$ denotes time reversal to produce a matched filter output x'[k] 221. The output x'k] of the matched filter is processed by an optional whitening filter 222 which produces v'[k] 224. In this simplified example system in FIG. 2, the v'[k] 224 is demapped by a demapper 226 to produce a'[k] 228. It should be understood that only FTN and THP specific functional blocks are shown in FIG. 2. Some other components that might be present are depicted by way of example in the system diagram of FIG. 1A.

In FIG. 2, the FTN time acceleration factor is denoted by $\tau$ and the pulse shape h(t) is assumed to be a root raised cosine (RRC) pulse with a roll-off factor denoted by $\beta$, but other pulse shapes are possible. In the specific example depicted, to use a monic and minimum phase filter for the zero-forcing THP (ZF-THP), spectral factorization of the overall discrete-time channel i.e. the $\tau T$-sampled raised cosine (RC) impulse response is used to obtain the filter response of the THP filter 208.

For the present example with ZF-THP, an equivalent Forney observation model can be obtained from the Ungerboeck model described above. To ensure that this is possible when an RRC pulse shaping is employed, FTN cases where $$\tau \geq \frac{1}{1+\beta}$$

are considered. However, it should be understood this is not a hard requirement for the relationship between $\tau$ and $\beta$. Different relationships may be supported using different spectral factorization of the overall channel impulse response. The minimum-phase component after spectral factorization is used for the THP filter 208 and the inverse of the maximum-phase component is used for whitening filter 222 at the receiver after the matched filter 220.

The spectral factorization satisfies:

$$G(z) = Z\{h(t) * h(-t)\}_{t=n\tau T} = V_1(z) \cdot V_i^* \left(\frac{1}{z^*}\right).$$

Compared to conventional THP pre-filter design for the channel, an inherent advantage in THP pre-filter design for ISI due to FTN transmission is that the spectral factorization, and the resulting THP filter 208, do not rely on receiving any feedback from the receiver regarding the ISI introduced by the channel itself. Instead, the spectral factorization and the resulting ISI are determined taking into account the known ISI introduced into signal s(t) due to FTN transmission, which is a function of the pulse shape h(t) (e.g. parameter $\beta$ for RRC pulses) and the FTN time acceleration factor $\tau$. The compensation for the channel induced ISI is done at the receiver as per conventional receiver design principles such as using a linear equalizer with a finite number of taps.

Expanded A-priori Demapper

Another embodiment provides a soft-demapper, referred to herein as an Expanded A-priori Demapper or "EAD" henceforth for a THP system. In a specific example, this EAD is applied in an FTN-THP system such as described above, in which case demapper 226 is implemented as an EAD. The described EAD may compensate for much of the modulo-loss that is inherent in a conventional demapper for a THP based transmission and may outperform existing THP demappers by significant margins, and may make THP competitive to optimal MAP equalization even when compared based on peak SNR.

Two methods to compute the LLR (or LAPPR (log a-posteriori-probability ratio)) values for the bits corresponding to the received symbols are provided for soft-FEC decoding based systems. This computed LAPPR value is then given as input to the subsequent FEC decoder 140 in a non-iterative manner. These are the memoryless EAD approach and the EAD-sliding window approach.

Memoryless EAD

Referring again to FIG. 1A, a system that transmits pulse amplitude modulation (PAM) symbols is considered. As the effective ISI taps due to the $\tau T$ sampled pulse for a PAM-based FTN transmission are real valued, any $M^2$-QAM constellation can be viewed as I and Q M-ary PAM modulation. The PAM symbols are denoted by a[k]'s and as a result of the THP system model considered above, the input to the demapper v'[k]'s are the AGN corrupted extended constellation points. An exemplary extended constellation (without AGN) in case of binary phase-shift keying (BPSK) transmission is shown FIG. 3.

Conventional THP with soft detection uses a modulo-operation before the demapper stage before computing the LAPPR values.

In order to reduce the modulo-loss associated with conventional THP, in accordance with an embodiment of the invention, the modulo-operation is not performed in the receiver. Instead LAPPR values are computed for the $n^{th}$ bit $b_n$ of the $k^{th}$ received symbol based on the received symbol v'[k] and the pre-computed a-priori probabilities of the extended constellation v[k] for a given combination of the pulse shape h(t) (e.g. parameter $\beta$ for RRC pulses) and the FTN parameter $\tau$. In a specific example, the calculation can be performed as follows:

$$LAPPR^{(k)}(b_n) = \log\frac{P(b_n = 1 \mid v'[k])}{P(b_n = 0 \mid v'[k])} \quad (1a)$$

$$= \log\frac{\sum_{c_i \in c_1} P(v'[k] \mid v[k] = c_i).P(v[k] = c_i)}{\sum_{c_j \in c_0} P(v'[k] \mid v[k] = c_j).P(v[k] = c_j)}$$

where $C_t$ is the set of symbols in the extended constellation set with $n^{th}$ assigned bit $b_n=t$, where $t=0$ or 1. Denoting the a-priori probabilities $\alpha_i=P(v[k]=c_i)$ and $\beta_j=P(v[k]=c_1)$, Eq. (1a) can be written as $$LAPPR^{(k)}(b_n) = \log\frac{\Sigma_{c_i \in c_1} \alpha_i \exp\left(-\frac{d_i}{2\sigma^2}\right)}{\Sigma_{c_j \in c_0} \beta_j \exp\left(-\frac{d_j}{2\sigma^2}\right)}, \quad (1b)$$

where $d_i=|v'[k]-c_i|^2$ and $\sigma^2$ is the AGN variance. Furthermore, if $$i^* = \mathrm{argmax}_{c_i \in C_1} \ \alpha_i \exp\left(-\frac{d_i}{2\sigma^2}\right) \text{ and } j^* = \mathrm{argmax}_{c_j \in C_0} \ \beta_j \exp\left(-\frac{d_j}{2\sigma^2}\right),$$

Eq. (1b) can be approximated by $$LAPPR^{(k)}(b_n) \approx \log\left(\frac{\alpha_{i^*}}{\beta_{j^*}}\right) + \frac{|v'[k]-c_{j^*}|^2 - |v'[k]-c_{i^*}|^2}{2\sigma^2} \quad (2)$$

While Equation (1b) gives the exact expression of the LAPPR, Equation (2) is an approximation that only considers nearest neighbor symbols of the extended constellation representing the nth bit being 1 or 0 with respect to the received symbol $v'[k]$.

Figure 3:
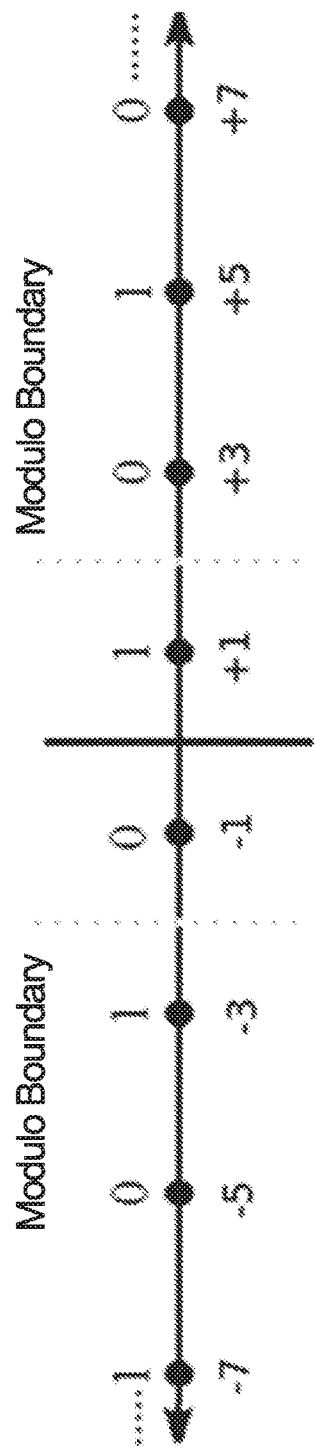
FIG. 3 is an example of an extended constellation for BPSK transmission.

With an extended constellation, such as in the example of FIG. 3, there is a modulo boundary, beyond which the modulo operation takes place in the transmitter (equivalently the appropriate addition of d[k] 202 in FIG. 2). More specifically, the signal v'[k] (224 in FIG. 2) at the receiver is an additive noise-corrupted version of the intermediate signal v[k] (204 in FIG. 2), the elements of which come from an extended constellation. This extension of the symbol constellation beyond the modulo boundary, such as the one shown in the exemplary FIG. 3, is caused due to the modulo operation at the transmitter (equivalently the appropriate addition of d[k] 202 in FIG. 2). In equation (2), the first term is effectively a bias term to account for known relationship between a given possible value of $b_n$, and the probability that the v[k] is outside the constellation. With knowledge of τ, this probability is an a-priori probability that is used to determine the first term in equation (2).

A specific example is provided for BPSK. The following is a method to analytically compute the a-priori probabilities P (v[k]=$c_i$) required for the LLR computation. The probabilities are derived for BPSK but the approach can be extended for any other constellations. From the equivalent linear structure of the THP transmitter in FIG. 2 where the modulo operation is replaced by an equivalent addition of a unique sequence d[k] to the data symbols α so that precoded symbols x[k] lie in the interval [−2,2], it can be seen that d[k]=4i whenever $-4i-2 \le \alpha[k]-f[k] \le -4i+2$ with $i \in Z$ where α[k]'s can be assumed to be a uniform i.i.d sequence taking ±1 values and the pdf of $f[k]=\Sigma_{m=1}^{L-1} v_1[m]x[k-m]$ being the output of the feedback filter can be well-approximated by a zero-mean Gaussian distribution i.e. $f[k] \sim N(0,\sigma_f^2)$. The probabilities of the extended constellation set can be written as:

$$P(v[k] = 4i-1) = P[(-4i-2 \le a[k] - f[k] \le -4i+2) \cap (a[k] = -1)]$$

$$= 0.5\left[\Phi\left(\frac{4i+1}{\sigma_f}\right) - \Phi\left(\frac{4i-3}{\sigma_f}\right)\right]$$

and similarly, $$P(v[k] = 4i+1) = 0.5\left[\Phi\left(\frac{4i+3}{\sigma_f}\right) - \Phi\left(\frac{4i-1}{\sigma_f}\right)\right]$$

where $$\Phi(x) = \frac{1}{\sqrt{2\pi}}\int_{-\infty}^{x} e^{\frac{-x^2}{2}}dx$$

constitutes the a-priori probabilities for the complete set of the extended constellation.

Figure 4A:
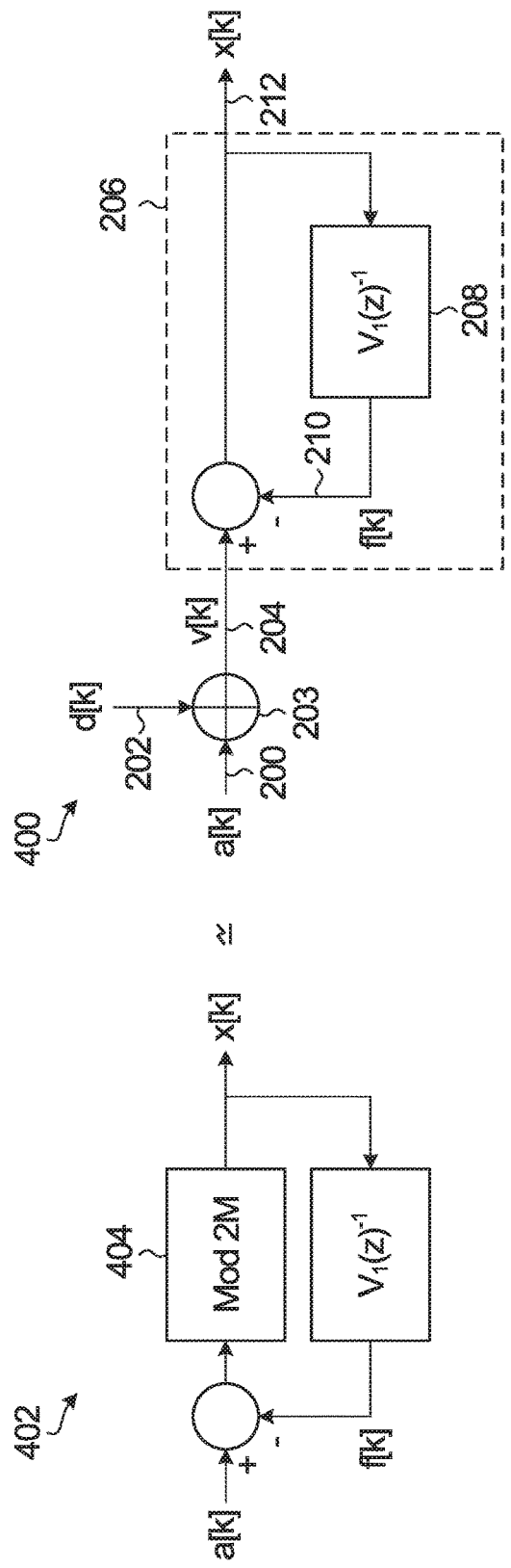
FIG. 4A is a transmitter equivalent block diagram.

The equivalence between the THP transmitter structure of FIG. 2 (including adder 203 and THP feedback loop 206) and a THP transmitter structure 402 with a modulo-operation 404 is depicted in FIG. 4A, where the THP transmitter structure of FIG. 2 is repeated at 400, for convenience.

In FIG. 4A, v[k]=α[k]+d[k] where d[k]=2iM (i∈I) for an M-ary PAM constellation. a[k]'s can be assumed to be an independent identically distributed (i.i.d) sequence taking M-PAM values. This can be ensured, for example, by using an interleaver after the FEC encoder at the transmitter. The output of the feedback filter $V_1(z)-1$ is denoted as $f[k]=\Sigma_{i=1}^{L-1} v_1[i]x[k-i]$, corresponding to the input x[k]. The probability distribution function (pdf) for f[k] can be approximated by a zero-mean Gaussian distribution i.e. $f[k] \sim N(0,\sigma_f^2)$.

If the set of M values of the M-ary PAM constellation is given by $A=\{\pm 1, \pm 3, \ldots, \pm(M-1)\}=\{\alpha_{PAM}^\kappa\}$, where κ=1, 2, ..., M, then the set V={A+2iM:i∈I} denotes the set of all odd integers which also forms the extended constellation set and the sets $\{\{\alpha_{PAM}^\kappa+2iM\}:\kappa=1, 2, \ldots, M\}$ form a partition for the set V.

From the construction of the equivalent block diagram shown in FIG. 4A, it can be seen that d[k]=2iM whenever $-2iM-M \le \alpha[k]-f[k] \le -2iM+M$ for any M-ary PAM constellation. therefore, $$P(v[k] = a_{PAM}^k + 2iM) \quad (3)$$

$$= P[(-2iM - M \le a[k] - f[k] \le -2iM + M) \cap (a[k] = a_{PAM}^k)]$$

$$= P[(-2iM - M \le a[k] - f[k] \le -2iM + M) | (a[k] = a_{PAM}^k)] \cdot P(a[k] = a_{PAM}^k)$$

$$= \frac{1}{M} P[((2i-1)M + a_{PAM}^k \le f[k] \le (2i+1)M + a_{PAM}^k)]$$

$$= \frac{1}{M}\left[\Phi\left(\frac{(2i+1)M + a_{PAM}^k}{\sigma_f}\right) - \Phi\left(\frac{(2i-1)M + a_{PAM}^k}{\sigma_f}\right)\right], \kappa = 1, 2, \ldots, M \,\&\, i \in I.$$

These values can be used to compute the LAPPRs above. This approach may have relatively low computational complexity compared to, for example, a full MAP decoder.

In some implementations, it may yield optimal performance for some $\tau \geq 1/(1+\beta)$ for a given pulse shape (e.g. specified by parameter $\beta$ for RRC pulses) such that there is no extension in the constellation. For a given pulse shape and $\tau$, the maximum value of the extension v'[k] for an M-ary PAM can be given as:

$$V_{max} = 2\left\lfloor \frac{M\Sigma_{k=0}^{L-1}|h[k]|+1}{2} \right\rfloor - 1 \qquad (4)$$

There is no need to buffer the received symbols as LAPPR is computed based on the current received symbol only. As a result, there is no delay in LAPPR computation; it can be calculated as soon as the current received symbol is obtained.

EAD-Sliding Window Metric Computation

Figure 8:
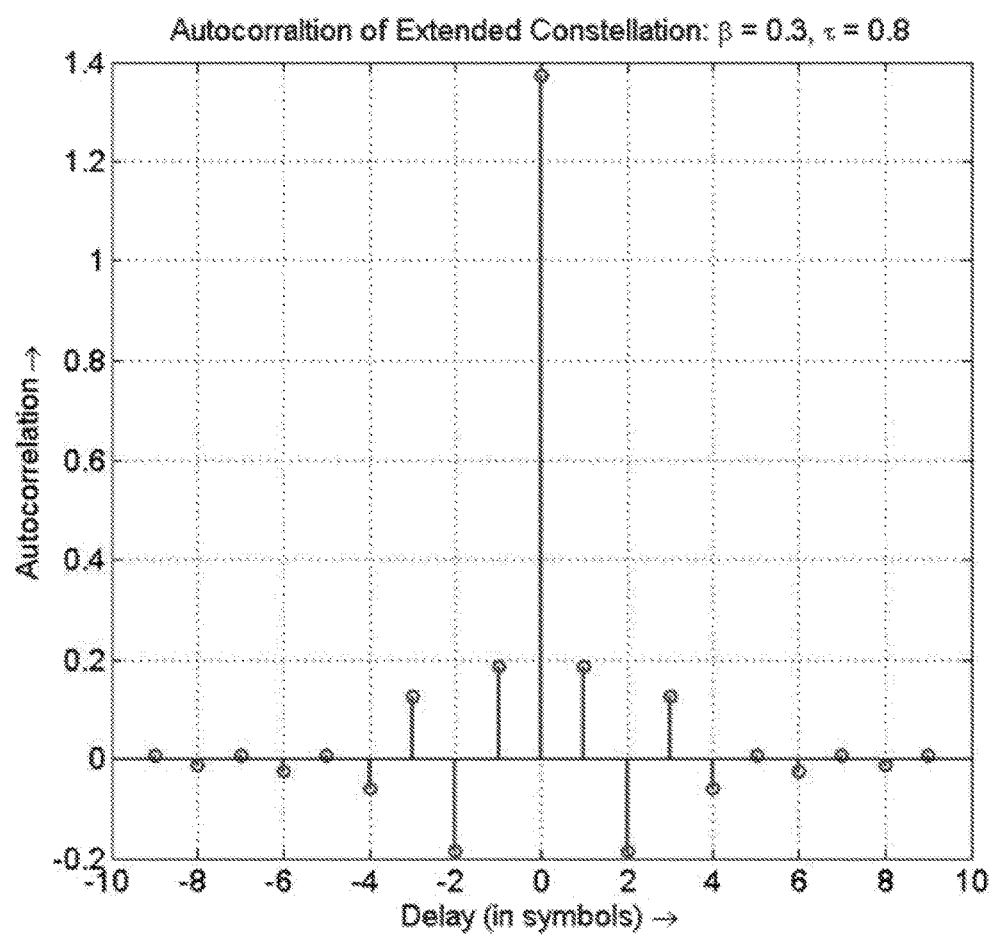
FIG. 8 is an example showing autocorrelation of Demapped symbols.

While the memoryless EAD approach described above takes into account the one-dimensional probability density function of the extended constellation symbols, it does not capture the correlation across symbols. FIG. 8 shows an example of autocorrelation of demapped symbols. As extension to the previous approach, a second method is provided to compute the LAPPR of the $n^{th}$ bit corresponding to the current $k^{th}$ symbol based on L previous and L succeeding symbols. This approach may yield a better performance than the previously described memoryless EAD. The dependence caused by the THP filter as exhibited by way of example in FIG. 8 is captured partially in this metric, which may lead to performance improvement in the form of reduced BERs after the FEC decoder compared to the memoryless EAD approach. This approach requires pre-computation and storage of the joint-probabilities $p(v_{k\ldots-L}, v_{k\ldots-L+1}, \ldots, v_k, \ldots, v_{k+L})$. The LAPPR value can be computed as below:

$$LAPPR^{(k)}(b_n) = \log\frac{P(b_n = 1 | v'[k])}{P(b_n = 0 | v'[k])} \qquad (5)$$

$$= \log\frac{P(b_n = 1 | v'[k-L], \ldots, v'[k], \ldots, v'[k+L])}{P(b_n = 0 | v'[k-L], \ldots, v'[k], \ldots, v'[k+L])}$$

$$= \log\frac{\Sigma_{c_i \in C_1} P(v[k] = c_i | v'[k-L], \ldots, v'[k], \ldots, v'[k+L])}{\Sigma_{c_j \in C_0} P(v[k] = c_j | v'[k-L], \ldots, v'[k], \ldots, v'[k+L])}$$

$$= \log\frac{\Sigma_{c_i \in C_1, c_{i,-L}, \ldots, c_{i+L}} P(v[k-L] = c_{i,-L}, \ldots, v[k] = c_i, \ldots v[k+L] = c_{i,+L} | v'[k-L], \ldots, v'[k], \ldots, v'[k+L])}{\Sigma_{c_j \in C_0, c_{j,-L}, \ldots, c_{j+L}} P(v[k-L] = c_{j,-L}, \ldots, v[k] = c_j, \ldots v[k+L] = c_{j,+L} | v'[k-L], \ldots, v'[k], \ldots, v'[k+L])}$$

$$= \log\frac{\Sigma_{c_i \in C_1, c_{i,-L}, \ldots, c_{i+L}} P(v'[k-L], \ldots, v'[k], \ldots, v'[k+L] | v[k-L] = c_{i,-L}, \ldots, v[k] = c_i, \ldots v[k+L] = c_{i,+L}).P(X_1^i)}{\Sigma_{c_j \in C_1, c_{j,-L}, \ldots, c_{j+L}} P(v'[k-L], \ldots, v'[k], \ldots, v'[k+L] | v[k-L] = c_{j,-L}, \ldots, v[k] = c_j, \ldots v[k+L] = c_{j,+L}).P(X_0^j)}$$

where, $X_1^i = (v[k-L], \ldots, v[k]=c_i, \ldots v[k+L])$ & $X_0^j = (v[k-L], \ldots, v[k]=c_j, \ldots v[k+L])$ are the 2L+1 length expanded symbol sequences, $P(X_1^i)$ are $P(X_0^j)$ the joint a-priori probabilities associated with the sequences with nth bit as 1 and 0 respectively.

Similar to Eq. (1a) and (1b), Eq. (5) can be approximated as:

$$LAPPR^{(k)}(b_n) \approx \log\left(\frac{P(X_1^{i^*})}{P(X_0^{j^*})}\right) + \frac{\|v' - c_{j^*}\|^2 - \|v' - c_{i^*}\|^2}{2\sigma^2} \qquad (6)$$

where $i^* = \mathrm{argmax}_{c_i \in C_1} P(v'[k-L], \ldots, v'[k], \ldots, v'[k+L] | v[k-L]=C_{i,-L}, \ldots, v[k]=c_i, \ldots v[k+L]=c_{i,+L}) \cdot P(X_1^i)$ and $$j^* = \underset{c_j \in C_0}{\mathrm{argmax}}\, P(v'[k-L], \ldots, v'[k], \ldots,$$

$$v'[k+L] | v[k-L] = c_{j,-L}, \ldots, v[k] = c_j, \ldots v[k+L] = c_{j,+L}).P(X_0^j)$$

where $X_1 = (v[k-L], \ldots, v[k]=c_i, \ldots v[k+L])$ & $X_0 = (v[k-L], \ldots, v[k]=c_j \ldots v[k+L])$ are the joint probabilities for the 2L+1 length sequences of the extended constellation symbols.

For a given window length 2L+1, depending on pulse shape h(t) and $\tau$, a big portion of the sequence $2^{(2L+1)}$ will have zero probability. So the storage requirement and the number of terms appearing in numerator and denominator will still be minimal compared to MAP and MLSE equalization approaches.

The EAD metric does not depend on the whiteness of the noise and only depends on the noise variance. The Sliding Window-EAD or multi-dimensional EAD metric makes use of a white noise assumption i.e. the noise samples in the 2L+1 length window are uncorrelated, and when this is true the approach will provide the best performance. However, non-white noise will not make it impossible to use the metric, although possibly there will be some performance loss. As mentioned above, there are other modules within the receiver DSP of modern communication systems that may whiten the noise without having an explicit noise whitening filter.

Figure 4B:
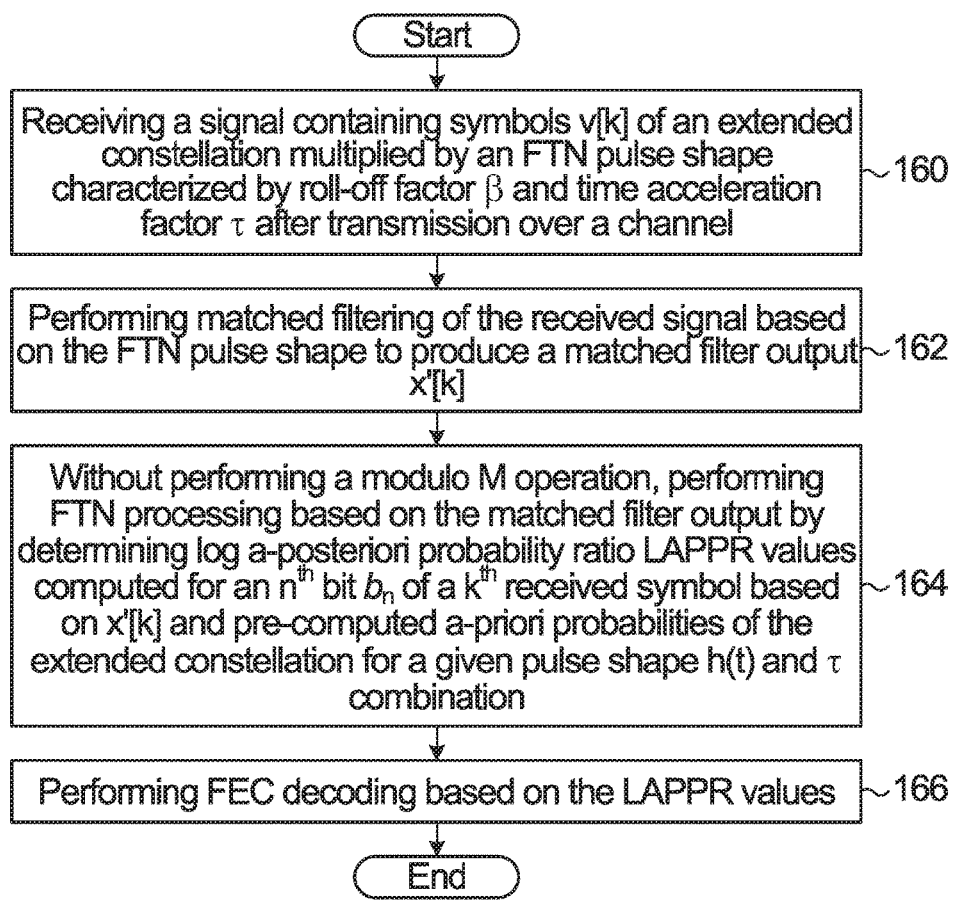
FIG. 4B is a flowchart of a method of receiving precoded FTN signalling.

Referring now to FIG. 4B, shown is a flowchart of a method of receiving precoded faster than Nyquist signalling provided by an embodiment of the invention. The method might, for example, be implemented in the receiver of FIG. 1A. Further details off possible implementations of the method are provided throughout this description. The method begins in block 160 with receiving a signal containing symbols v[k] of an extended constellation multiplied by an FTN pulse shape characterized by roll-off factor β and time acceleration factor τ after transmission over a channel. The method continues in block 162 with performing matched filtering of the received signal based on the FTN pulse shape to produce a matched filter output x'[k]. In block 164, without performing a modulo M operation, FTN processing is performed based on the matched filter output by determining log a-posteriori probability ratio LAPPR values computed for an $n^{th}$ bit $b_n$ of a $k^{th}$ received symbol based on x'[k] and pre-computed a-priori probabilities of the extended constellation for a given pulse shape h(t) and τ combination. In block 166, FEC decoding is performed based on the LAPPR values.

Optionally, the method further includes whitening filtering the matched filter output x'[k] to produce a whitening filter output v'[k]. In this case, performing FTN processing based on x'[k] involves performing FTN processing based on the whitening filter output v'[k].

In an embodiment where the whitening filter is not used, the noise may be colored, and whitening may be achieved through other means such as a CD compensating filter in case of optical transmission or a tapped delay line equalizer that compensates for the frequency selectivity of a wireless channel.

An alternate embodiment includes both a feedback (FB) and feedforward (FF) filter, with the two filters obtained through spectral factorization implemented at the transmitter. In this case the transmit power is modified.

Example Performance Results

Figure 5:
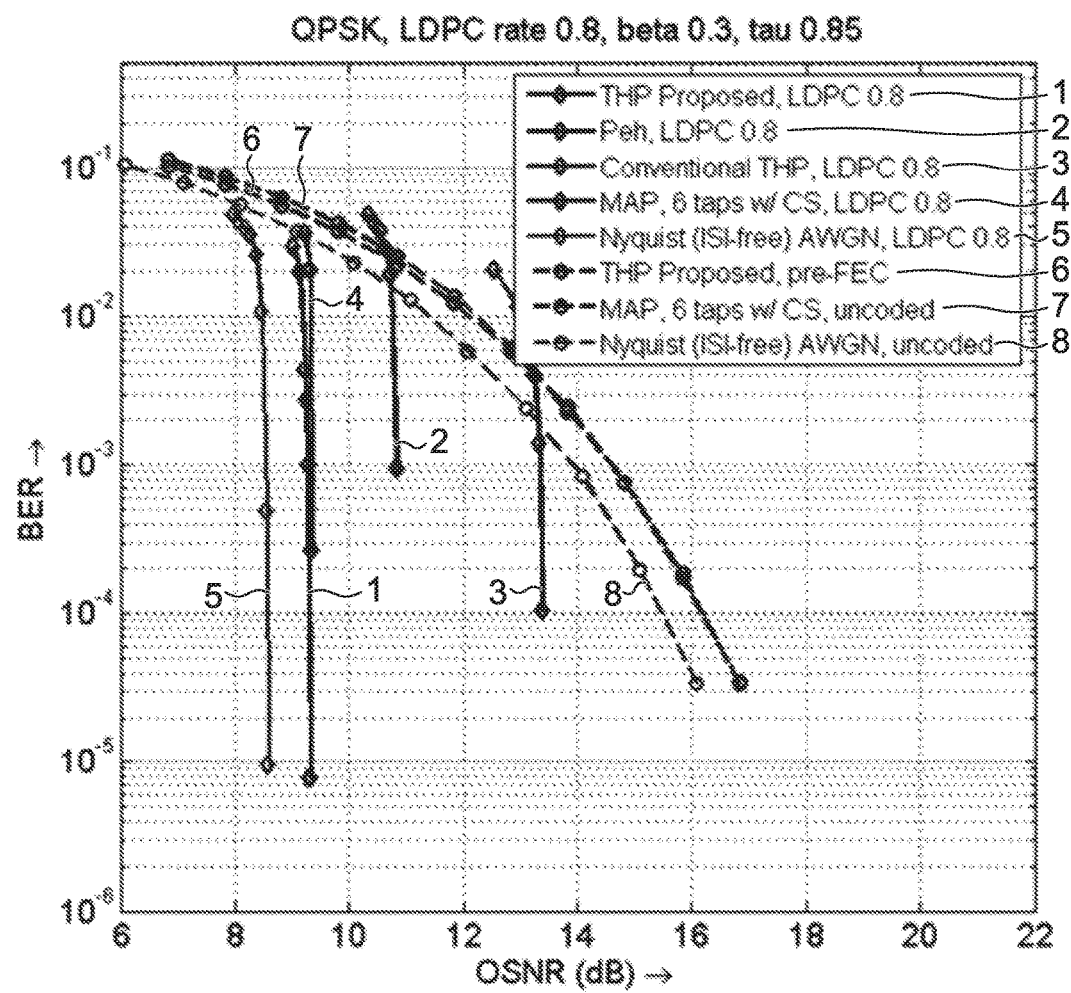
FIG. 5 is a plot showing example gains from EAD for QPSK with $\tau=0.85$.
Figure 6:
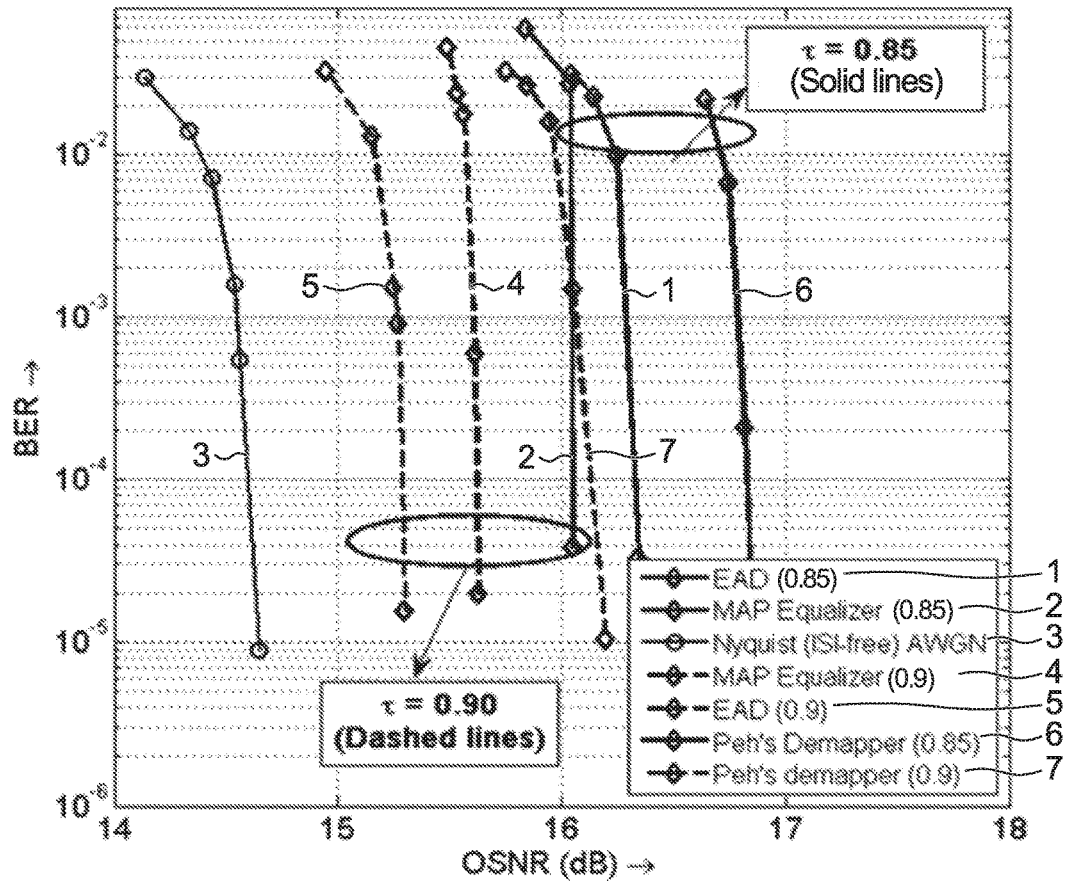
FIG. 6 is a plot showing example gains from EAD for 16-QAM with different values of $\tau=[0.85, 0.9]$.
Figure 7A:
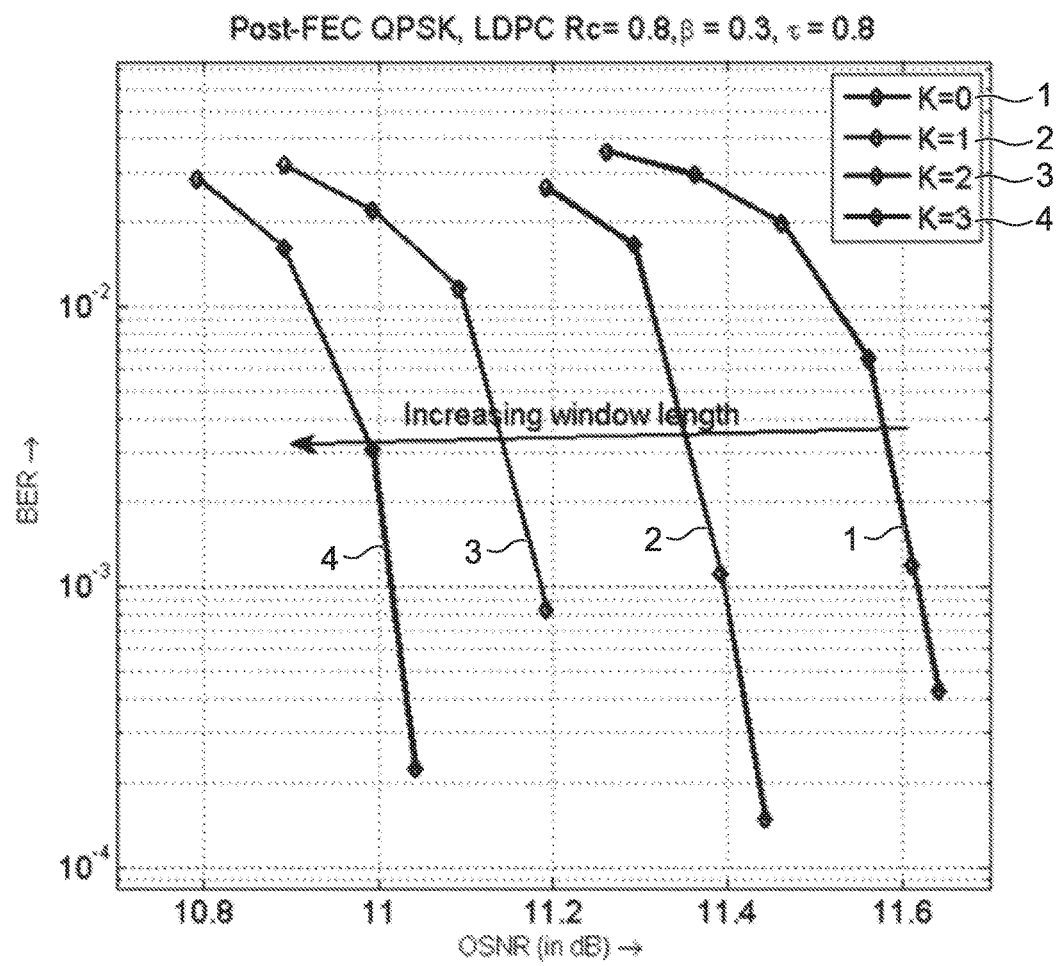
FIGS. 7A and 7B are BER plots showing example improvement from Sliding Window EAD.
Figure 7B:
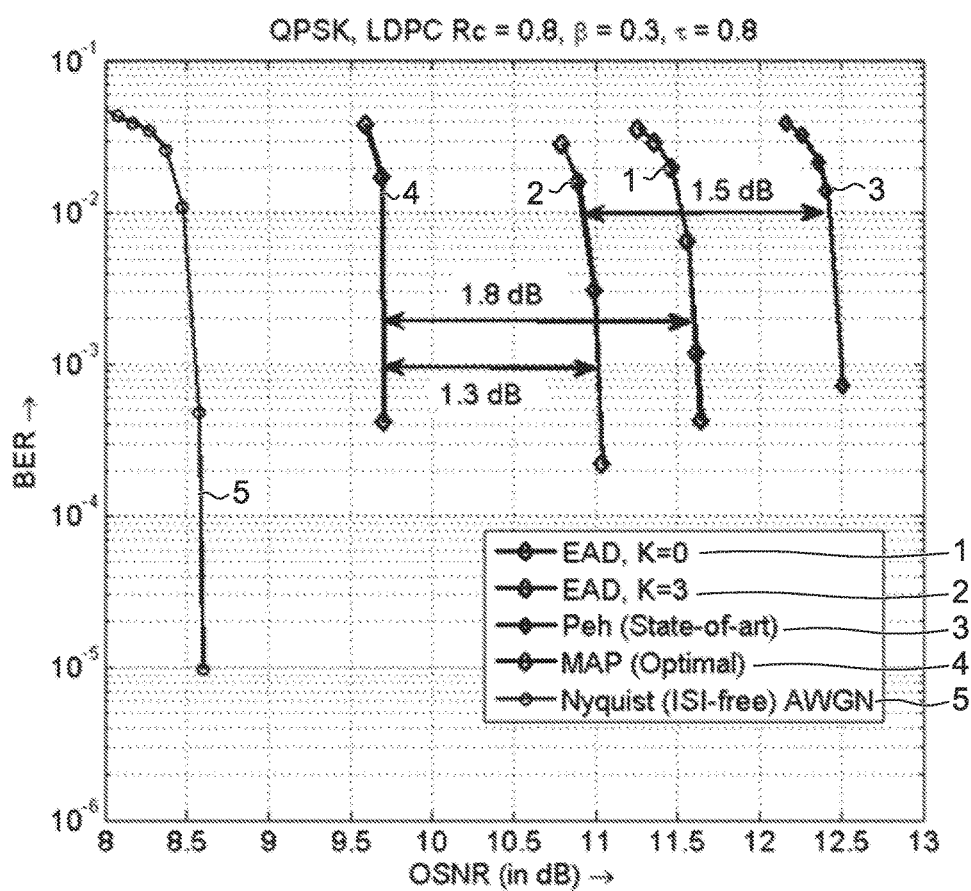

In order to show the benefits of the described methods, considered is a 1000 km standard single mode fiber (SSMF) with chromatic dispersion (CD) parameter value=−22.63 $ps^2$/km and polarization mode dispersion parameter 0.8 ps/$\sqrt{km}$. Other parameters considered for the simulation are: pulse shape h(t) is a RRC pulse with β=0.3, FEC coding is LDPC coding rate=0.8 and Baud rate=32/τ Gbaud/s. At the receiver a noise whitening-filter is used before the chromatic dispersion (CD) and polarization mode dispersion (PMD) compensation followed by the memoryless EAD. Example performance results are shown in FIGS. 5 and 6. Examples of possible improvements from using the Sliding Window EAD are depicted in FIGS. 7A and 7B where an increase in the value of the number of symbols considered in the vicinity of the $k^{th}$ symbol is shown to improve performance compared to the memoryless EAD and correspondingly bridges the gap from the optimal MAP equalizer. In FIG. 7A, shown are example performance results for a simulation of post-FEC QPSK, with LDPC coding rate Rc=0.8, β=0.3 and τ=0.8 for a window length 2K+1, where K=0 (curve 1) (equivalent to memoryless), and window length 2K+1, where K=1, 2, 3 (curves 2, 3, 4), and it can be seen that the performance improves with increasing K. In FIG. 7B, shown are example performance results for a simulation of QPSK, with LDPC coding rate Rc=0.8, β=0.3 and τ=0.8, for K=0 (window length=1) (curve 1) (memoryless) and a window length for K=3 (window length 2K+1=7)(curve 2). FIG. 7B also shows the performance of Peh (See Peh et al. in "Expanded Soft Demapper for LDPC Coded GMD-THP MIMO System", in IEEE Radio and Wireless Symposium, 2007, pp. 519-522) (curve 3), MAP (optimal) (curve 4), and Nyquist (ISI-free) AWGN (curve 5). The performance for K=3 is closer to that of the optimal MAP receiver than the performance for K=0.

Although the present invention has been described with reference to specific features and embodiments thereof, various modifications and combinations can be made thereto without departing from the invention. The description and drawings are, accordingly, to be regarded simply as an illustration of some embodiments of the invention as defined by the appended claims, and are contemplated to cover any and all modifications, variations, combinations or equivalents that fall within the scope of the present invention. Therefore, although the present invention and its advantages have been described in detail, various changes, substitutions and alterations can be made herein without departing from the invention as defined by the appended claims. Moreover, the scope of the present application is not intended to be limited to the particular embodiments of the process, machine, manufacture, composition of matter, means, methods and steps described in the specification. As one of ordinary skill in the art will readily appreciate from the disclosure of the present invention, processes, machines, manufacture, compositions of matter, means, methods, or steps, presently existing or later to be developed, that perform substantially the same function or achieve substantially the same result as the corresponding embodiments described herein may be utilized according to the present invention. Accordingly, the appended claims are intended to include within their scope such processes, machines, manufacture, compositions of matter, means, methods, or steps.

Moreover, any module, component, or device exemplified herein that executes instructions may include or otherwise have access to a non-transitory computer/processor readable storage medium or media for storage of information, such as computer/processor readable instructions, data structures, program modules, and/or other data. A non-exhaustive list of examples of non-transitory computer/processor readable storage media includes magnetic cassettes, magnetic tape, magnetic disk storage or other magnetic storage devices, optical disks such as compact disc read-only memory (CD-ROM), digital video discs or digital versatile disc (DVDs), Blu-ray Disc™, or other optical storage, volatile and non-volatile, removable and non-removable media implemented in any method or technology, random-access memory (RAM), read-only memory (ROM), electrically erasable programmable read-only memory (EEPROM), flash memory or other memory technology. Any such non-transitory computer/processor storage media may be part of a device or accessible or connectable thereto. Any application or module herein described may be implemented using computer/processor readable/executable instructions that may be stored or otherwise held by such non-transitory computer/processor readable storage media.

The invention claimed is:

1. A method comprising:
   in a receiver, receiving a signal containing a plurality of received symbols, each received symbol comprising a symbol of an extended constellation multiplied by a faster than Nyquist (FTN) pulse shape characterized by roll-off factor β and time acceleration factor τ after transmission over a channel;
   in the receiver, performing matched filtering of the received signal based on the FTN pulse shape to produce a matched filter output;
   in the receiver, for a kth received symbol v of the plurality of received symbols, without performing a modulo M operation, performing FTN processing based on the matched filter output by determining log a-posteriori probability ratio (LAPPR) values computed for each bit of the kth received symbol based on x'[k] and pre-computed a-priori probabilities of the extended constellation for a given pulse shape h(t) and τ combination, where x'[k] is the matched filter output for the kth received symbol v[k];

$$LAPPR^{(k)}(b_n) = \log\frac{P(b_n = 1 \mid v'[k])}{P(b_n = 0 \mid v'[k])}$$

$$= \log\frac{P(b_n = 1 \mid v'[k-L], ..., v'[k], ..., v'[k+L])}{P(b_n = 0 \mid v'[k-L], ..., v'[k], ..., v'[k+L])}$$

$$= \log\frac{\Sigma_{c_i \in C_1} P(v[k] = c_i \mid v'[k-L], ..., v'[k], ..., v'[k+L])}{\Sigma_{c_j \in C_0} P(v[k] = c_j \mid v'[k-L], ..., v'[k], ..., v'[k+L])}$$

$$= \log\frac{\Sigma_{c_i \in C_1, c_{i-L},...,c_{i+L}} P(v[k-L] = c_{i,-L}, ..., v[k] = c_i, ...v[k+L] = c_{i,+L} \mid v'[k-L], ..., v'[k], ..., v'[k+L])}{\Sigma_{c_j \in C_0, c_{j-L},...,c_{j+L}} P(v[k-L] = c_{j,-L}, ..., v[k] = c_j, ...v[k+L] = c_{j,+L} \mid v'[k-L], ..., v'[k], ..., v'[k+L])}$$

$$= \log\frac{\Sigma_{c_i \in C_1, c_{i-L},...,c_{i+L}} P(v'[k-L], ..., v'[k], ..., v'[k+L] \mid v[k-L] = c_{i,-L}, ..., v[k] = c_i, ...v[k+L] = c_{i,+L}).P(X_1^i)}{\Sigma_{c_j \in C_1, c_{j-L},...,c_{j+L}} P(v'[k-L], ..., v'[k], ..., v'[k+L] \mid v[k-L] = c_{j,-L}, ..., v[k] = c_j, ...v[k+L] = c_{j,+L}).P(X_0^j)} \quad (5)$$

or $$LAPPR^{(k)}(b_n) \approx \log\left(\frac{P(X_1^{i*})}{P(X_0^{j*})}\right) + \frac{\|v' - c_{j*}\|^2 - \|v' - c_{i*}\|^2}{2\sigma^2}$$

in the receiver, performing forward error correction (FEC) decoding based on the LAPPR values.

2. The method of claim 1 further comprising:
in the receiver, whitening filtering the matched filter output x'[k] to produce a whitening filtered output v'[k]; wherein performing FTN processing based on x'[k] comprises performing FTN processing based on the whitening filter output v'[k].

3. The method of claim 2 wherein the whitening filtering has a frequency response that is an inverse of a maximum phase representation of a spectral factorization of h(t)*h(−t), where h(t) is the faster than Nyquist pulse shape.

4. The method of claim 1 wherein determining LAPPR values comprises employing $$LAPPR^{(k)}(b_n) = \log\frac{P(b_n = 1 \mid v'[k])}{P(b_n = 0 \mid v'[k])}$$

$$= \log\frac{\Sigma_{c_i \in C_1} P(v'[k] \mid v[k] = c_i).P(v[k] = c_i)}{\Sigma_{c_j \in C_0} P(v'[k] \mid v[k] = c_j).P(v[k] = c_j)}$$

or $$LAPPR^{(k)}(b_n) = \log\frac{\Sigma_{c_i \in C_1} \alpha_i \exp\left(-\frac{d_i}{2\sigma^2}\right)}{\Sigma_{c_j \in C_0} \beta_j \exp\left(-\frac{d_j}{2\sigma^2}\right)}$$

or $$LAPPR^{(k)}(b_n) \approx \log\left(\frac{\alpha_{i*}}{\beta_{j*}}\right) + \frac{|v'[k] - c_{j*}|^2 - |v'[k] - c_{i*}|^2}{2\sigma^2}.$$

where $C_t$ is the set of symbols in the extended constellation set with $n^{th}$ assigned bit $b_n = t$, where t=0 or 1, where n is an integer between 1 and a total number of bits of the kth symbol.

5. The method of claim 1 wherein
determining the LAPPR values for each bit of the kth received symbol is based on the kth received symbol and L previous and L succeeding symbols where L≥1.

6. The method of claim 1 wherein determining LAPPR values comprises using where $C_t$ is the set of symbols in the extended constellation set with $n^{th}$ assigned bit $b_n = t$, where t=0 or 1, and where n is an integer between 1 and a total number of bits of the kth symbol.

7. A receiver comprising:
an optical-electrical front end;
a coherent optical receiver comprising an analog-to-digital converter (ADC), matched filter, polarization mode dispersion (PMD) compensator, log likelihood ratio (LLR) generator from Tomlinson-Harashima Precoding (THP) symbols;
a soft-decision FEC decoder;
wherein the LLR generator from THP symbols generates soft-decisions for use by the soft-decision forward error correction (FEC) decoder using the method of claim 1.

8. The receiver of claim 7 wherein the LLR generator comprises a whitening filter that performs said whitening filtering and has frequency response that is an inverse of a maximum phase representation of a spectral factorization of h(t)*h(−t), where h(t) is the faster than Nyquist pulse shape.

9. The receiver of claim 7 wherein the LLR generator is configured to determine LAPPR values for each bit of the kth received symbol based on the kth received symbol and L previous and L succeeding symbols where L≥1.

10. An optical system comprising:
the receiver of claim 7;
a transmitter; and
the transmitter comprising:
a forward error correction (FEC) encoder;
a coherent optical transmitter comprising a quadrature amplitude modulation (QAM) mapper, a Tomlinson-Harashima Precoder (THP), a faster than Nyquist (FTN) pulse shaper, and a digital-to-analog converter;
an electrical-optical front end;
wherein the THP produces precoded symbols by applying Tomlinson-Harashima precoding based on at least one input representative of ISI that will be introduced as a result of using a faster than Nyquist pulse shape; and wherein the pulse shaper applies pulse shaping to the precoded symbols with the faster than Nyquist (FTN) pulse shape.

11. The optical system of claim 10 wherein the THP comprises a THP filter in a feedback loop within the transmitter.

12. The optical system of claim 11 wherein the THP filter has a frequency response that is a minimum phase representation of a spectral factorization of h(t)*h(−t), where h(t) is the faster than Nyquist pulse shape.

13. The optical system of claim 11, wherein M-ary PAM signalling is employed, the transmitter further comprises:
   a modulo 2M operator in a forward path of the feedback loop.

14. The optical system of claim 11, wherein M-ary PAM signalling is employed, the transmitter further comprising:
   an adder, prior to the feedback loop, that adds an amount to PAM symbols, wherein a result of adding the amount is equivalent to a result of performing a modulo 2M operation in a forward path of the feedback loop.

15. The optical system of claim 10, wherein the FTN pulse shape is a raised root cosine (RRC) pulse shape characterized by roll-off factor β and FTN time acceleration factor τ, with 0<τ<1.

16. The method of claim 1 further comprising:
   in an optical transmitter, applying Tomlinson-Harashima Precoding (THP) to produce precoded symbols, wherein applying the THP is based on at least one input representative of inter-symbol interference (ISI) due to using faster than Nyquist (FTN) signalling;
   in the optical transmitter, applying pulse shaping to the precoded symbols with a faster than Nyquist (FTN) pulse shape;
   transmitting a signal based on an output of the pulse shaping;
   wherein the signal received by the optical receiver is the signal transmitted by the optical transmitter after transmission over an optical link.

17. The method of claim 16 wherein applying the THP in the optical transmitter comprises using a THP filter in a feedback loop within the optical transmitter.

18. The method of claim 17 wherein the THP filter has a frequency response that is a minimum phase representation of a spectral factorization of h(t)*h(−t), where h(t) is the faster than Nyquist pulse shape.

19. The method of claim 17, wherein M-ary PAM signalling is employed, the method further comprising:
   in the optical transmitter, performing a modulo 2M operation in a forward path of the feedback loop.

20. The method of claim 17, wherein M-ary PAM signalling is employed, the method further comprising:
   in the optical transmitter, prior to the feedback loop, adding an amount to PAM symbols, wherein a result of adding the amount is equivalent to a result of performing a modulo 2M operation in the forward path of the feedback loop.

21. The method of claim 16, wherein the FTN pulse shape is a raised root cosine (RRC) pulse shape characterized by β, and FTN time acceleration factor τ, with 0<τ<1.

* * * * *